United States Patent [19]

Wolowodiuk

[11] Patent Number: 4,594,967
[45] Date of Patent: Jun. 17, 1986

[54] CIRCULATING SOLIDS FLUIDIZED BED REACTOR AND METHOD OF OPERATING SAME

[75] Inventor: Walter Wolowodiuk, Chatham, N.J.

[73] Assignee: Foster Wheeler Energy Corporation, Livingston, N.J.

[21] Appl. No.: 710,725

[22] Filed: Mar. 11, 1985

[51] Int. Cl.$^4$ ............................................. B09B 3/00
[52] U.S. Cl. ................................... 122/4 D; 110/245;
110/263; 110/344; 110/345; 110/347;
165/104.16
[58] Field of Search ............... 110/347, 245, 263, 344,
110/345; 122/4 D; 165/104.16

[56] References Cited

U.S. PATENT DOCUMENTS

| | | |
|---|---|---|
| 2,842,102 | 7/1958 | Blaskowski . |
| 3,387,590 | 6/1968 | Bishop . |
| 3,736,908 | 6/1973 | Ehrlich et al. . |
| 3,763,830 | 10/1973 | Robinson et al. . |
| 3,893,426 | 7/1975 | Bryers . |
| 4,177,741 | 12/1979 | Stewart et al. . |
| 4,227,488 | 10/1980 | Stewart et al. . |
| 4,240,377 | 12/1980 | Johnson . |
| 4,303,023 | 12/1981 | Perkins et al. ...................... 110/347 |
| 4,325,327 | 4/1982 | Kantesaria et al. ................ 122/4 D |
| 4,414,905 | 11/1983 | Beranek et al. ...................... 110/245 |
| 4,469,050 | 9/1984 | Korenberg ......................... 122/4 D |

Primary Examiner—Edward G. Favors
Attorney, Agent, or Firm—Marvin A. Naigur; John E. Wilson; Warren B. Kice

[57] ABSTRACT

A fluidized bed reactor and a method of operating same in which three discrete chambers are formed in a housing and a main fluidized bed containing particulate fuel and adsorbent material is established in a first chamber. The fluidizing air in the first chamber entrains a portion of the particulate material as it passes through the bed and the first chamber. A portion of the particulate material that is entrained by the air is separated and introduced to additional grid means disposed in a second chamber to establish a bed of the separated particulate material. Air and a cooling fluid are passed through the bed of separated particulate material for cooling same. The cooled separated particulate material is passed to a third chamber for storage and the latter is connected to the main fluidized bed for selectively reinjecting the cooled separated particulate material back to the main fluidized bed. A portion of the separated particulate material may also be introduced to another fluidized bed operating under conditions to convert the calcium sulfide formed in the main bed to calcium sulfate.

13 Claims, 1 Drawing Figure

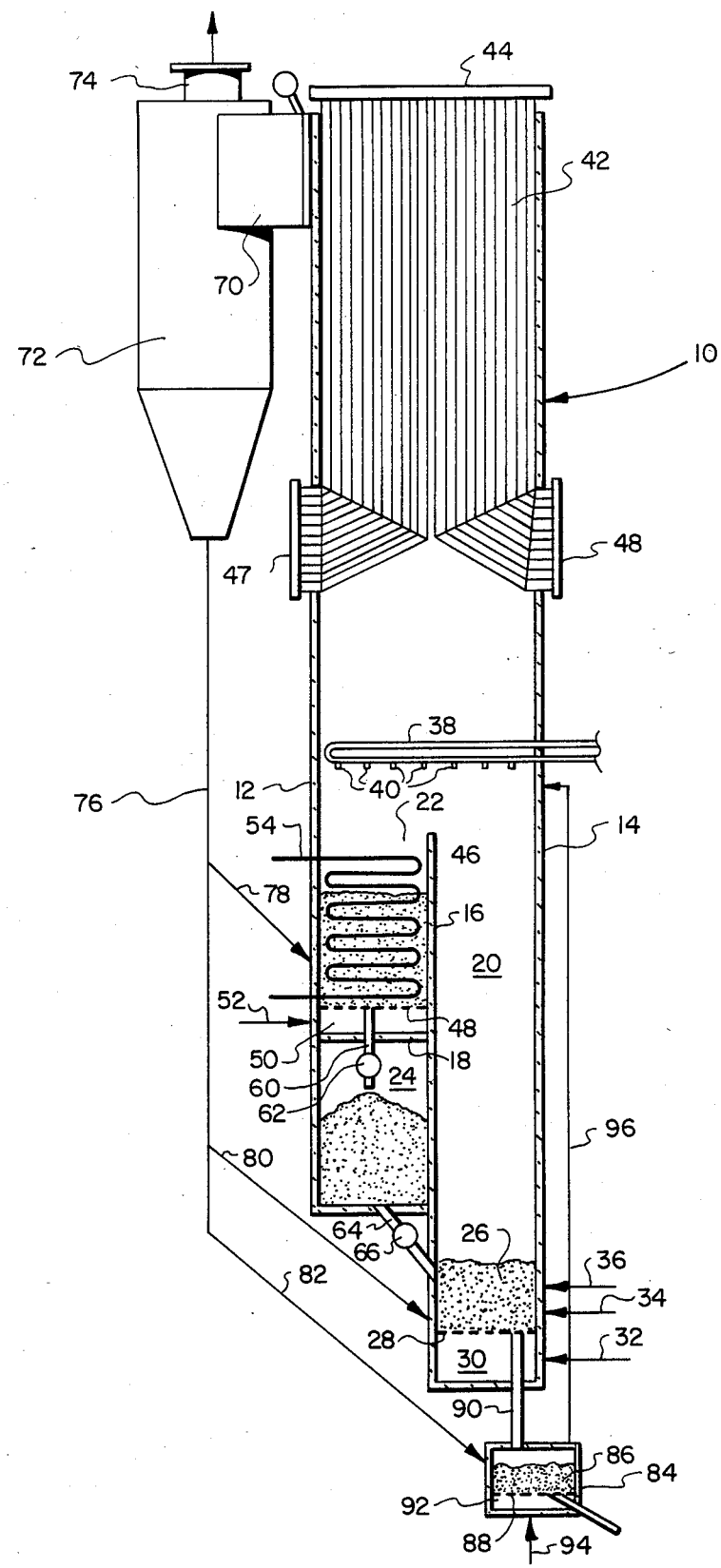

CIRCULATING SOLIDS FLUIDIZED BED REACTOR AND METHOD OF OPERATING SAME

BACKGROUND OF THE INVENTION

This invention relates to a fluidized bed reactor and method of operating same and, more particularly, to such a reactor and method in which heat is generated by the combustion of particulate fuel in a fluidized bed.

Fluidized bed reactors, usually in the form of combustors, boilers, gasifiers, or steam generators, are well known. In a normal fluidized bed arrangement, air is passed through an air distribution grid, which supports a bed of particulate material, usually including a mixture of fuel material, such as high sulfur bituminous coal, fuel ash, and an adsorbent material for the sulfur released as a result of the combustion of the coal. As a result of the air passing through the bed, the bed behaves like a boiling liquid which promotes the combustion of the fuel. In addition to enjoying a capability for considerably reducing the amount of sulfur-containing gases introduced to the atmosphere, such an arrangement permits relatively high heat transfer rates per unit size, substantially uniform bed temperatures, relatively low combustion temperatures, ease of fuel handling, reduction in corrosion and boiler fouling, and the generation of a relatively low volume of nitrous oxides. To maintain the bed temperature at the desired level, usually between 1400–1800° F., heat has to be removed from the bed. This is usually accomplished by inserting tubes into the bed through which water, steam or air is circulated and heated. For good combustion, the amount of air introduced through the air distribution grid is on the order of 20 percent higher than theoretically necessary. Furthermore, the fuel introduced into the bed has to be uniformly distributed over the bed plan area to prevent formation of pockets of reducing atmosphere. However, these units, which normally operate with fluidizing velocities of 5–10 ft./sec., have a number of drawbacks.

For example, combustion efficiency decreases as the fluidizing velocity increases. To improve this, fines recirculation is required which is costly and difficult to operate. Also, in-bed heat transfer tubes are subject to erosion which increases as the fluidizing velocity increases and a large quantity of limestone is required to capture the sulfur dioxides generated from the sulfur in the fuel. Further, it is difficult to obtain uniform fuel distribution over the cross-section area of the bed and previous attempts to do this has, in many instances, proven to . be unreliable.

SUMMARY OF THE INVENTION

It is therefore an object of the present invention to provide a fluidized bed reactor and method of operating same in which the reaction efficiency of the overall operation is considerably increased while the main fluidized bed is maintained within acceptable operating temperature ranges.

It is a further object of the present invention to provide a fluidized bed reactor and method of the above type in which erosion of the in-bed heat transfer tubes is minimized.

It is a still further object of the present invention to provide a fluidized bed reactor and method of the above type in which the amount of limestone required to capture the sulfur dioxides is reduced.

It is a still further object of the present invention to provide a fluidized bed reactor and method of the above type in which the particulate fuel material is distributed over the fluidized bed in a uniform manner.

It is a more specific object of the present invention to provide a fluidized bed reactor and method of the above type in which the entrained solid particulate material from the fluidized bed is separated from the gas and cooled in a discrete environment before being reinjected back into the main fluidized bed.

It is a more specific object of the present invention to provide a fluidized bed reactor and method of the above type in which the calcium sulfide formed in the main fluidized bed is converted to calcium sulfate in a separate fluidized bed.

Toward the fulfillment of this and other objects, the fluidized bed of the present invention is formed by defining three discrete chambers in a housing and introducing a particulate fuel and absorbent materials to the first chamber. Air is passed through the bed of particulate material established in the first chamber to fluidize same and promote the combustion of the fuel, with the air entraining a large portion of the particulate material as it passes through the bed and the first chamber.

Since the first chamber contains no heat transfer tubes, its fluidizing velocity can be relatively high—10 to 40 ft./sec. Since this chamber operates in sub-stoichiometric mode, additional air is added above this chamber to complete combustion.

The particulate material that is contained by the combustion gases is partially cooled in the upper portion of the combustor which contains heat transfer surface in the form of platens and enclosure walls.

A portion of the partially cooled particulate material that is entrained by the combustion gases is separated and reintroduced into the first chamber for controlling the bed temperature, or into the second chamber for additional cooling. The second chamber, which contains heat transfer tubes, operates with very low fluidizing velocities to prevent erosion of the tubes. The third chamber is connected to the main fluidized bed for selectively reinjecting the cooled separated particulate material back to the main fluidized bed.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings which is a vertical sectional view of the fluidized bed reactor of the prevent invention.

DESCRIPTION OF THE PREFERRED EMBODIMENT

Referring to FIG. 1 of the drawings, the reference numeral 10 refers in general to a housing forming a major portion of a fluidized bed reactor which may be in the form of a combustor, a steam generator or any similar type device. The enclosure 10 includes of a front wall 12 and rear wall 14 disposed in a spaced, parallel relation. Although not shown for the convenience of presentation, two sidewalls are provided which interconnect with the walls 12 and 14 to form the enclosure 10.

Each of the walls 12 and 14, as well as the sidewalls, can be formed by a plurality of vertically-extending tubes disposed in a spaced, parallel relationship and connected together by a plurality of elongated fins extending for the entire lengths of the tubes and connected to diametrically opposed surfaces of the tubes. Since this is a conventional design it is not shown in detail in the drawing.

A vertical partition 16 is disposed in the lower portion of the enclosure 10 and extends between the walls 12 and 14 in a spaced, parallel relation. A horizontal partition 18 extends between the wall 12 and the partition 16 to define three chambers 20, 22 and 24.

A bed of particulate material, shown in general by the reference numeral 26, is disposed in the lower portion of the chamber 20 and rests on a distribution grid 28 extending horizontally in the latter chamber. The bed 26 consists of a mixture of discrete particles of fuel material such as bituminous coal, coal ash, and a calcium-containing adsorbent material, such as limestone, for adsorbing the sulfur released by the combustion of the fuel material.

An air plenum 30 is provided immediately below the grid 28 and air from a conduit 32 connected to the plenum distributes pressurized air from an external source (not shown) to the plenum. The air entering the plenum 30 passes through the perforations, or nozzles, in the grid 28 and into the bed 26 for fluidizing the particulate material.

Two feeders, shown schematically by the reference numerals 34 and 36, extend through the wall 14 and receive particulate coal and limestone, respectively from inlet ducts or the like (not shown), and are adapted to feed the particles into the bed 26.

A plurality of tubes 38 are disposed in the upper portion of the enclosure above the chambers 20 and 22 and extend through corresponding openings in the wall 14. Each tube contains a plurality of small nozzles for introducing additional air necessary to complete combustion above the chambers 20 and 22. It is understood that the tubes 38 are supported in a conventional manner within the enclosure 10.

A plurality of vertical platens, one of which is shown by the reference numeral 42, are provided in the upper portion of the enclosure 10. Each platen consists of a plurality of spaced, vertically-extending water tubes disposed in a spaced, parallel relationship. The tubes in the lower portion of each platen 42 bend into two directions with the tubes forming the right portion of the panel, as viewed in the drawing, penetrating the wall 14 and the tubes forming the left portion of the panel penetrating the wall 12. A upper header 44 is connected to the upper end portions of the tubes forming each platen 42, and a pair of headers 47 and 48 are connected to the lower end portions of the tubes for circulating water through the platen to cool the upper portion of the enclosure. It is understood that there are a plurality of additional platens spaced from the platen 42 in the plane of the drawing.

A bed of particulate material, shown in general by the reference numeral 46, is disposed in the chamber 22 and rests on a grid 48, extending horizontally in the latter chamber. An air plenum 50 is provided immediately below the grid 48 and air from a conduit 52 connected to the plenum distributes pressurized air from an external source to the plenum. The air entering the plenum 50 passes through the openings in the grid 48 and into the bed 96 for fluidizing the particulate material.

A bank of heat exchanges tubes, one of which is shown by the reference numeral 54 is disposed in the bed 46. Each tube 54 extends in a serpentine manner with its end portions extending through corresponding openings in the wall 12. The tubes 54 are supported in a conventional manner within enclosure 10, it being understood that the bank of tubes consists of additional tubes formed in the manner identical to the tube 54 and spaced from the latter tube in the plane of the drawing.

The aforementioned end portions of each tube 54 are adapted to respectively receive and discharge a fluid, so that the fluid circulates through the entire length of the tubes in the bed 46 and thus receives heat from the bed and cools the particulate material in the bed. A drain conduit 60, having a valve 62 disposed therein, extends from the bed 46, through the partition 18, and into the chamber 24 for selectively discharging the bed material from the bed 46 into the chamber 24. The chamber 24, in turn, is connected via a discharge conduit 64 to the main bed 26 and a valve 66 is disposed in the conduit 64 to control the flow of particulate material from the chamber 24 to the bed 26, as will be described.

A discharge conduit 70 registers with an opening formed in the upper end portion of the wall 12 and receives the mixture of combustion gases and particulate matter from the fluidized bed 26 after it has passed the platens 42. The conduit 70 is connected to a solids separator 72, preferably of the cyclone type, which operates in a conventional manner to separate the solid particles entrained by the gaseous products of combustion. An outlet 74 is provided on the separator 72 for discharging the clean gas to an external source, and the separated solid particles discharge, via the lower end portion of the separator 72 into a discharge conduit 76.

Three branch conduits 78, 80 and 82 extend from the discharge conduit 76, with the conduit 78 discharging into the fluidized bed 46 disposed in the chamber 22, and the conduit 80 discharging directly into the fluidized bed 26 disposed in the lower portion of the chamber 20.

A separate enclosure 84 is provided which houses a bed 86 of material resting on an air distribution grid 88 extending horizontally in the enclosure 84. The bed material consists essentially of spent fuel material and calcium sulfide formed by reaction of the limestone and fuel material in the bed 26, which are transferred from the latter bed by a drain pipe 90 extending from the bed 26, through the enclosure 10, and discharging into the upper portion of the enclosure 84. An air plenum 92 is provided immediately below the grid 88 and air from a conduit 94 connected to the plenum 92 is distributed to the plenum. The air entering the plenum 92 passes through the openings in the grid 88 and into the bed 86 to fluidize same. The branch conduit 82 is also connected to the enclosure 84 for distributing a portion of the separated particulate material from the separator 72 to the bed 86.

An air line 96 extends from the upper portion of the enclosure 84 and through the wall 14 adjacent the upper portion of the chamber 20 for distributing air from the enclosure 84 to the chamber 20 for combusting the gases in the latter chamber.

In operation, pressurized air from the conduit 32 passes through the plenum 30, the air distribution grid 28, and through the bed 26 in a generally upwardly direction to fluidize the particulate material in the bed. A light-off burner (not shown) is fired to heat the particulate fuel material in the bed 26 until the temperature of the material reaches a predetermined level, and additional particulate fuel and adsorbent is discharged from the feeders 34 and 36, respectively, into the bed 26 as needed.

After the bed 26 has been fluidized and has reached a predetermined elevated temperature in accordance with the foregoing, the light-off burner is turned off while the feeders 34 and 36 continue to feed particulate fuel and adsorbent to the bed in accordance with predetermined feed rates.

The air from the plenum 30, usually 50-80 percent of the theoretical air necessary for a complete combustion, by virtue of passing through the bed 26, reacts with the fuel to partially oxide it. Operating the bed 26 in the reducing mode reduces the amount of nitrous oxide generated and eliminates the need for multiple fuel feed points which otherwise would be necessary if the bed was in the fully oxidizing mode. Furthermore, because there are no tubes in the bed, and thus no fear of tube erosion, the bed 26 can operate at very high fluidizing velocities—up to 40 ft./sec. Thus a relatively small bed can be used. Because of these high fluidizing velocities, a large portion of the material in the bed 26 is entrained by the combustion gases and are carried into the upper cavity defined by the tops of chambers 20 and 22 and the bottom of the platens 42. Additional air is introduced into this cavity through the tube 38. This air will react with the combustible gas generated in the bed 26 and chamber 20 and will promote the combustion of some unburned fuel particles in the above-mentioned cavity. Because of the lower gas velocity in this cavity, larger particles that are carried out of chamber 20 will fall into chamber 22. The temperatures of the gaseous products of combustion and the remaining particulate material are reduced as they pass over the relatively cool enclosure walls 12 & 14 and the platens 42 before they exit, via the discharge conduit 70, into the separator 72.

The separator 72 operates to separate the solid particulate material from the gases, with the latter exiting via the conduit 74 and the former exiting via the conduit 76. A portion of the solid particulate material from the discharge conduit 76 is fed, via the branch conduit 78, into the chamber 22 thus forming a bed 46 on the grid 48. Air from the conduit 52 is introduced, via the plenum 50, into the bed 46 to fluidize same and to promote the combustion of the elutriated fuel particles from the chamber 20. Water is circulated via the tubes 54 to reduce the temperature of the particulate material in the bed 46. The bed 46 operates at relatively low velocities (3-6 ft./sec.) to minimize erosion of the tubes 54. The cooled material is then passed, via the conduit 60, into the chamber 24 where it is stored in a cooled state.

The valve 66 disposed in the conduit 64 is selectively actuated as needed to distribute the stored unreacted particulate material from the chamber 24 back into the main bed 26 as needed.

A portion of the separated unreacted particulate material from the discharge conduit 76 can be selectively passed, via branch conduit 80, directly into the main fluidized bed for bed temperature control purposes as needed.

An additional portion of the unreacted particulate material from the discharge conduit 76 can be passed directly into the fluidized bed 86 which contains calcium sulfide resulting from the reaction of the particulate fuel material with the limestone in the main bed 26 and which is transferred to the bed 86 by the drain pipe 90. The discharge of air into the bed 86, via the conduit 94 and the plenum 92 and the temperature of the bed are controlled so that the calcium sulfide is converted to calcium sulfate which is considerably easier to dispose of than the calcium sulfide.

It is thus seen that several advantages result from the foregoing. For example, the efficiency of the overall system is considerably improved by reinjecting the separated particulate solids materials containing unreacted fuel back into the bed which would otherwise be lost. Also, the main bed can operate within its normal temperature ranges since the separated particulate material is cooled before it is reintroduced into the bed.

Further, the cooled separated particulate material is stored so that it can be selectively added to the fluidized bed as needed and the calcium sulfide formed in the system is converted to calcium sulfate which is easily transportable and handleable.

It is understood that several variations may be made in the foregoing without departing from the scope of the invention. For example, valve means may be provided in connection with the discharge conduit 76 and its branch conduits 78, 80 and 82 to selectively provide for the discharge of the separated particulate material into the fluidized bed 46, the chamber 24 and the fluidized bed 86 as needed.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A reactor comprising a housing, partition means for dividing said housing into threee chambers, grid means disposed in a first chamber, means for introducing a particulate fuel material to said grid means to establish a bed of said material, means for passing air through said bed to fluidize same and promote the combustion of said fuel, said air entraining a portion of said particulate material as it passes through said bed and said first chamber, means for separating said portion of particulate material from said air, additional grid means disposed in a second chamber, means for introducing said separated particulate material to said additional grid means to establish a bed of said separated particulate material, means for passing air through said bed of separated particulate material in said second chamber to fluidize same, means for cooling said bed of separated particulate material in said second chamber, means connecting said second chamber to a third chamber to permit the discharge of said separated particulate material to said third chamber for storing same, means defining a fourth chamber, grid means disposed in said fourth chamber, means for introducing at least a portion of said separated particulate material to said latter grid means to establish an additional bed of separated particulate material in said fourth chamber, and means for passing air through said additional bed of separated particulate material to fluidize same.

2. The reactor of claim 1 further comprising means connecting said third chamber to said first chamber for discharging said separated particulate material back to the first bed in said first chamber.

3. The reactor of claim 1 wherein said second chamber is disposed to the side of said first chamber and wherein both chambers communicate with a common freeboard space above said chambers.

4. The reactor of claim 3 further comprising cooling means disposed in said freeboard space for cooling the entrained solids and gaseous products of combustion from said fluidized bed located in said first chamber.

5. The reactor of claim 1 wherein said third chamber extends below said second chamber.

6. The reactor of claim 1 further comprising means for introducing a particulate sorbent material to said bed of particulate fuel material in said first chamber for adsorbing the sulfur produced as a result of combustion of said fuel material, a portion of the material in said bed being entrained by said combustion gases and separated by said separating means.

7. The reactor of claim 6 wherein said sorbent material reacts with said sulfur to form calcium sulfide and wherein the air passed through said additional bed of separated particulate material converts said calcium sulfide to calcium sulfate.

8. The method of operating a fluidized bed reactor comprising the steps of dividing a housing into three chambers, establishing a bed of particulate material in a first chamber, passing air through said bed to fluidize same and promote the combustion of said fuel, said air entraining a portion of said particulate material as it passes through said bed and said first chamber, separating said portion of particulate material from said air, introducing said separated particulate material to a second chamber to establish a bed of said separated particulate material, passing air through said bed of separated particulate material in said second chamber to fluidize same, cooling said bed of separated particulate material in said second chamber, connecting said second chamber to a third chamber to permit the discharge of said separated particulate material to said third chamber for storing same, introducing at least a portion of said separated particulate material to a fourth chamber to establish an additional bed of separated particulate material, and passing air through said additional bed of separated particulate material is said fourth chamber to fluidize same.

9. The method of claim 8 further comprising the step of connecting said third chamber to said first chamber for discharging said separated particulate material back to the first bed in said first chamber.

10. The method of claim 8 wherein said second chamber is disposed to the side of said first chamber and wherein both chambers communicate with a common freeboard space above said chambers.

11. The method of claim 10 further comprising the step of cooling said freeboard space for cooling the air and gaseous products of combustion from said fluidized beds.

12. The method of claim 8 further comprising the steps of introducing a particulate sorbent material to said bed of particulate fuel material in said first chamber for adsorbing the sulfur produced as a result of combustion of said fuel material, a portion of said bed material being entrained by said combustion gas, and separating said bed material from said combustion gas.

13. The method of claim 12 wherein said sorbent material reacts with said sulfur to form calcium sulfide and wherein the air passed through said additional bed of separated particulate material converts said calcium sulfide to calcium sulfate.

* * * * *